United States Patent [19]

Krapp et al.

[11] Patent Number: 4,775,283

[45] Date of Patent: Oct. 4, 1988

[54] VEHICLE FOR TRANSPORTING REFUSE OR THE LIKE

[75] Inventors: Gerhard Krapp, Helmenzen; Robert Wittal, Flammersfeld, both of Fed. Rep. of Germany

[73] Assignee: Firma Edgar Georg, Neitersen, Fed. Rep. of Germany

[21] Appl. No.: 846,457

[22] PCT Filed: Jun. 19, 1985

[86] PCT No.: PCT/EP85/00299

§ 371 Date: Mar. 31, 1986

§ 102(e) Date: Mar. 31, 1986

[87] PCT Pub. No.: WO86/00602

PCT Pub. Date: Jan. 30, 1986

[30] Foreign Application Priority Data

Jul. 7, 1984 [DE] Fed. Rep. of Germany ....... 3425083

[51] Int. Cl.[4] ............................ B60P 1/28; B60P 7/02

[52] U.S. Cl. .................................... 414/492; 296/101; 298/8 R; 414/513; 414/517; 414/521; 414/525 R

[58] Field of Search ........... 414/492, 517, 521, 525 R, 414/513, 509, 510, 511, 516; 298/8 R; 296/101

[56] References Cited

U.S. PATENT DOCUMENTS

| | | | |
|---|---|---|---|
| 2,849,255 | 8/1958 | Pasker | 298/22 J |
| 3,455,471 | 7/1969 | Merther | 414/525 |
| 3,643,824 | 2/1972 | Partridge | 414/492 |
| 3,809,267 | 5/1974 | Knight | 414/350 X |
| 3,815,764 | 6/1974 | Gilfillan et al. | 414/517 X |
| 3,833,255 | 9/1974 | Logue | 296/101 |
| 3,953,170 | 4/1976 | Webb | 414/517 |
| 4,096,959 | 6/1978 | Schaffler | 414/525 X |
| 4,111,485 | 9/1978 | Martin et al. | 414/492 X |
| 4,200,330 | 4/1980 | Scott | 296/101 X |
| 4,230,359 | 10/1980 | Smith | 296/101 |
| 4,249,852 | 2/1981 | Alstad | 414/514 |
| 4,352,624 | 10/1982 | Matsumoto | 414/400 |

FOREIGN PATENT DOCUMENTS

| | | |
|---|---|---|
| 829416 | 3/1960 | United Kingdom . |
| 1308299 | 2/1973 | United Kingdom . |

*Primary Examiner*—Robert J. Spar
*Assistant Examiner*—Stuart J. Millman
*Attorney, Agent, or Firm*—Spencer & Frank

[57] ABSTRACT

Vehicle for transporting refuse or the like comprising a container (2) secured to the frame (1) of the vehicle and provided with a rear foldable wall, the container (2) being transversely separated with respect to the longitudinal axis of the vehicle into two parts, the front part (3) being secure to the frame (1) of the vehicle and the rear part (4) being connected to the frame (1) of the vehicle so as to tilt upwardly about a transversal axis (5) situated at the end of the vehicle; in the container (2) there is arranged a pusher plate (15) covering the inner cross-section of the container, connected to a pushing drive (16) and displaceably arranged from the end of the container situated on the driver side longitudinally at least up to the guiding area of the container (2).

17 Claims, 2 Drawing Sheets

VEHICLE FOR TRANSPORTING REFUSE OR THE LIKE

The invention relates to a vehicle for transporting refuse or the like comprising a container fastened to the vehicle frame and equipped with a foldable rear wall. Since the distances between cities and refuse dumps have become increasingly greater, it is no longer possible for economical reasons to transport the collected refuse in the refuse collecting vehicle directly to the dump. More and more frequently the necessity arises for reloading the refuse still within the respective city or municipal area for transportation to the dump, at one or a plurality of turnover points from the refuse collecting vehicle to refuse transporting vehicles having a larger capacity for transportation to the dump. In this connection it is known, for example, to equip the reloading stations with pressing devices into which the refuse is discharged from the collecting vehicle and where it is compacted with the aid of a press into a transportable container which is then transported to the dump with the aid of a special vehicle. Due to the intensive compacting of the refuse in the transporting vessel, an appropriate unloading device must also be provided at the dump, but such device must be mobile to adjust to the progressive filling of the dump. In addition to the complicated structure of such compactors, this also results in additional costs for the unloading device.

Since, in further development of refuse collecting vehicles, for example in the so-called drum refuse trucks, the collected refuse is already compacted considerably within the collecting vehicle, this provides an opportunity to dump the refuse, already compacted in the collecting vehicle, without noticeable loosening of the refuse, into a transportable container which is open at the top, with the open top of such container then being designed to be closable for transport. This would also be possible, for example, with a high-rim dump truck of corresponding capacity. The difficulty with a simple dump truck having the appropriate capacity is, however, that due to the soft and uneven ground at the unloading location at the dump, the center of gravity of the vehicle may be laterally displaced so much when the bed of the truck is tilted that the vehicle topples over.

It is now the object of the invention to provide a vehicle of the above-defined type which with the largest possible container lengths permitted by motor vehicle safety standards, still permits danger-free and simple dumping of the container contents on soft and uneven ground.

This is accomplished by the invention in that the container is subdivided into two parts transversely to the longitudinal axis of the vehicle; that the front portion of the container is fixed to the vehicle frame; that the rear portion of the container is connected with the vehicle frame so as to be tiltable about a transverse axis disposed in the region of the vehicle end and is in communication with a tilting drive; that a ram plate is disposed within the container so as to cover its inner cross section and is connected with a pushing drive so as to be longitudinally displaceable from the driver's cabin side of the container at least to the region where the container is subdivided. A vehicle of such design permits the use of a container of maximum permissible length and thus maximum permissible capacity for the vehicle. By subdividing the container it is possible, in conjunction with the ram plate which sweeps at least through the front container area, to empty the container, once the rear wall has been opened, with the aid of the ram plate so as to push the volume of refuse disposed in the front container portion in the longitudinal direction until the ram plate has reached the partition area between the front and rear container portion. Now the refuse remaining in the rear portion of the container can be emptied in the usual manner by tilting up the rear container portion. Since in this case only part of the entire container length needs to be tilted, the danger of the vehicle tipping over when the rear container end is tilted up no longer exists even if the center of gravity of the entire vehicle is displaced laterally in an unfavorable manner due to a laterally oblique position of the vehicle.

As a feature of the invention, it is provided that the rear container portion includes, at least in its end region, a cross section which increases in the direction toward the foldable rear wall. Thus, when the ram plate ejects the contents of the container, the pressure exerted on the side walls by the compacted refuse is reduced. Since advisably the upper container opening extends practically over the entire length of the container and can be closed only by means of foldable covers, a further feature provides that, in order to enlarge the cross section, the container bottom is given a downward slope at least in its end region. This makes it possible to obtain the desired cross-sectional enlargement even if the container width as a whole has already reached the permissible clearance profile. When the container contents is ejected, it is able to escape upwardly and downwardly, due to the slope of the container bottom, thus reducing the pressure on the side walls.

As an expedient feature of the invention, it is further provided that the dividing groove in both side walls slopes rearwardly toward the container bottom, beginning at the upper edge of the side walls. This has the advantage that, with the rear container portion lowered, the two side wall portions of the rear container portion rest on the edges of the two adjacent side wall portions of the front container portion so that a tight seal is assured here. A further advantage is that, when the contents of the container are ejected by the ram plate, the dividing groove lies in the region of the exposed upper edge of the side walls in an area in which the container contents exert practically no lateral pressure on the side walls. This is the case, in particular, if, according to a further feature of the invention, in the bottom area of the container, the dividing groove extends approximately in the region of half the container length. Such a subdivision of the container has the additional advantage that, during ejection of the container contents from the front container portion into the rear container portion, compacting is still relatively slight but, on the other hand, with the given permissible total dimensions for such a container, tilting the rear container portion upwardly so as to empty out the remaining contents does not endanger the vehicle even if it is in an unfavorable oblique position where its center of gravity is laterally displaced. A further advantage in such a subdivision of the container is also that the pushing drive which is advisably designed as a hydraulic piston-cylinder unit does not require an overly long hydraulic piston-cylinder unit.

In a suitable feature of the invention, the ram plate is longitudinally guided by at least one guide rail provided in the lower wall region of each side wall of the container. This results not only in good uncanted guidance of the ram plate within the container but additionally transverse forces are prevented from acting on the pusher drive, particularly with the use of a hydraulic piston-cylinder unit as the pushing drive, so that the hydraulic piston-cylinder unit can be articulated to the ram plate and is stressed only in its axial direction.

As a preferred feature of the invention it is provided that at least one centering projection which cooperates with the vehicle frame is disposed at the rear container portion, preferably in the region of the dividing groove on the exterior of the container bottom. It is here particularly advisable to provide at least two centering projections at the rear container portion which extend laterally beyond the vehicle frame and can be locked to the vehicle frame. With such a centering projection it is assured, on the one hand, that the ram plate performs a perfect transition from the guide rails of the front container portion into the guide rails of the rear container portion over the interruption in the form of the dividing groove even if, during ejection of the container contents, the pressure acting on the side walls is greater on one side. The capability of locking the lowered rear container portion to the vehicle frame not only secures the rear container portion against inadvertent movement during travel but also secures the rear container portion against inadvertent upward tilting during ejection of the container contents because of the tractive forces which act on the side walls and produce a moment about the container tilt axis which acts on the container in the tilting direction.

As one feature of the invention, it is provided that the ram plate is releasably connected with the pushing drive and, in its end-of-pushing position is held by the rear container portion to be tiltable together with it. With a ram plate which is fixed to the pushing drive, the former must be pushed relatively far into the rear container portion during emptying and must then be retracted at least far enough so that the dividing groove in the bottom area between the front and rear container portions is exposed and the rear container portion can be tilted. Only in this way can it be prevented that, after retraction of the ram plate into the front container portion, part of the container fill slides back from the rear container into the front container portion. However, if the ram plate and the pushing drive are releasably connected, the ram plate, once it has been pushed into the rear container portion, takes over the function of the container front wall, so that the container is emptied properly and completely during the subsequent dumping.

Advisably, the ram plate has such a configuration that its side edges are inclined in the pressing direction with respect to the side walls. This somewhat concave configuration of the ram plate with respect to the container contents prevents, at least in the immediate area of influence of the ram plate on the container contents, excess transverse stresses on the side walls from the developing compacting pressure.

Particularly if a hydraulic piston-cylinder unit is employed as the pushing drive, the ram plate, as a further feature of the invention, is provided, in its center region, with a bulge which projects into the interior of the container and with a bottom plate which starts at the forwardly inclined side edges and extends over the entire width immediately above the container bottom. Although this bulge which projects into the container interior, on the one hand, results in a slight reduction of usable container volume, it has the advantage, on the other hand, that firstly sufficient space is available for the installed length of the hydraulic cylinder so that the pushing drive which is to be designed as a telescoping cylinder can operate with a relatively small number of telescoping members. Moreover, this bulge provides more favorable pressure distribution when the container contents are being pushed out.

As a further feature of the invention it is provided that the two side walls of the container, in the region of the dividing groove, preferably in the upper region, are each provided with at least one centering means which produces a form locking connection between the two adjacent side walls of both container portions when the rear container rests on the vehicle frame. This results in a stiffening of the upper container edge in the region of the dividing groove particularly during ejection of the contents of the container.

As a further feature of the invention, it is provided that the covers of the upper container opening can be arrested in an approximately perpendicular position. This has the advantage, particularly for the emptying process, that, when the container contents are being pushed out of the front container portion into the rear container portion, the quantities of refuse pressed up under the influence of the compacting pressure cannot fall out over the side edges so that positive emptying is effected exclusively over the rear edge of the vehicle. Advisably the covers are connected with at least one pivot drive. This not only facilitates handling during opening and closing of the covers but also provides an opportunity to hold the covers in an approximately vertical position by way of the pivot drive.

The vehicle according to the invention may be designed as a motor vehicle as well as a motor vehicle trailer. However, it is particularly advisable to design the vehicle as a semitrailer for a tractor trailer truck since in this way, not only the greatest possible container volume is available on the basis of the motor vehicle safety regulations but it is also possible to operate in a particularly economical manner since it is possible to operate with several semitrailers and only one tractor.

The invention will now be explained in greater detail with the aid of schematic drawings of one embodiment. It is shown in:

Figure 4:
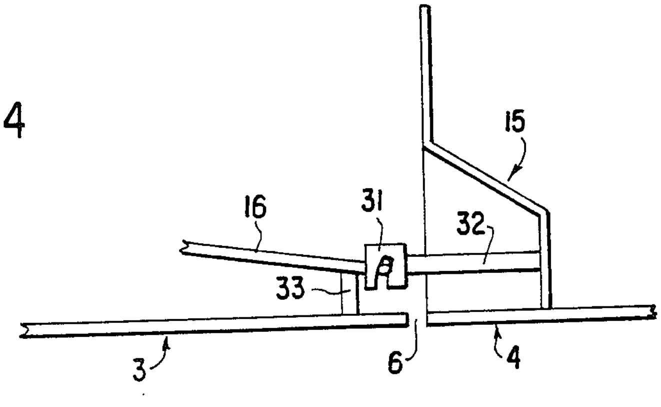

FIG. 4, a releasable connection between two of the parts.

Figure 1:
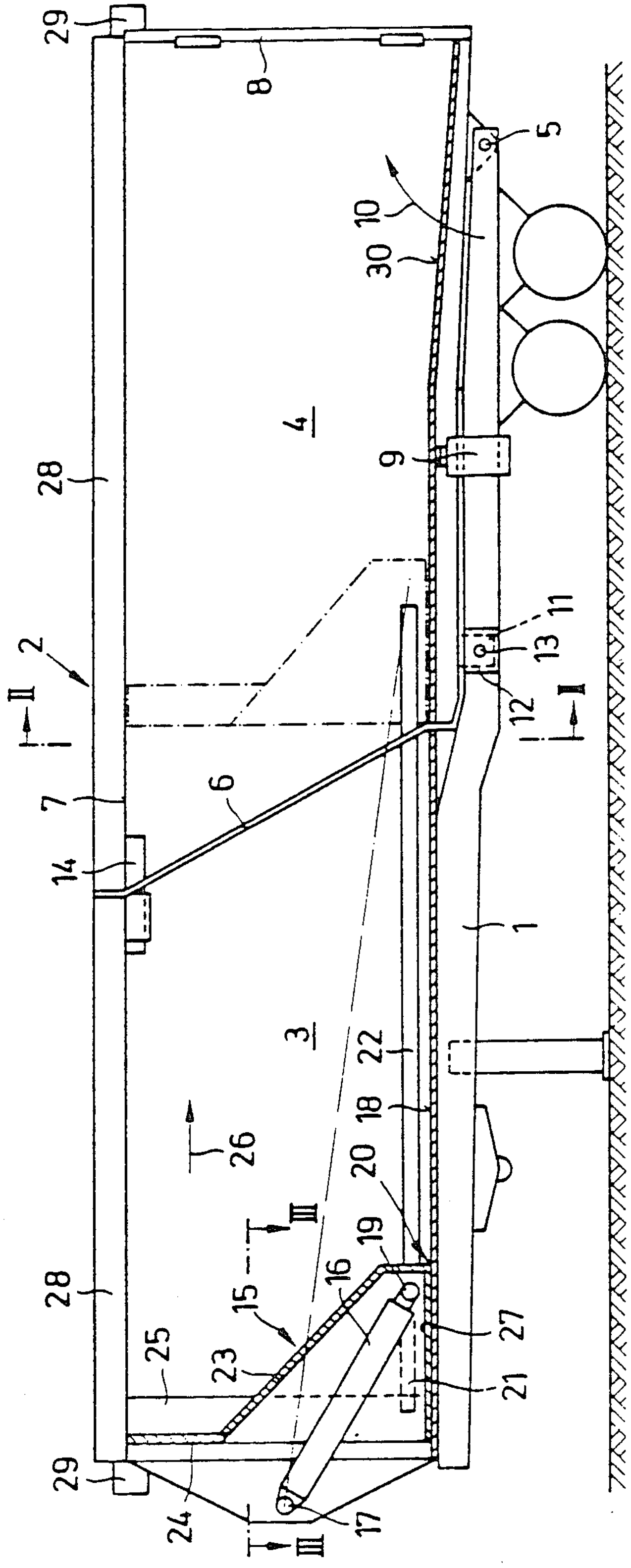
FIG. 1 is a schematic longitudinal sectional view of a semitrailer.

In the semitrailer for a tractor trailer truck shown in FIG. 1, a container 2 is disposed on a vehicle frame 1. The container 2, which is open at the top over its entire length, is here divided into a front container portion 3 and a rear container portion 4. The front container portion 3 is fixed to vehicle frame 1, while the rear container portion 4 is connected with the vehicle frame 1 so as to be tiltable about a transverse axis 5 lying in the region of the end of the vehicle. Container portions 3 and 4 change into one another without a partition. In the region of the two side walls, a groove 6 dividing the two container portions 3 and 4 starts at the upper edge 7 of the container and slopes toward the rear, while in the bottom region dividing groove 6 extends transversely to the longitudinal axis of the vehicle approximately in the region of half the container length. The rear wall 8 of the rear container portion is designed to be opened by folding, advisably in such a manner that two door-wing-like wall portions can be folded laterally against the exteriors of the side walls.

To pivot up rear container portion 4, a hydraulic piston-cylinder unit, a so-called dump press 9 is provided with the aid of which the rear container portion 4 can be pivoted upwardly with respect to the plane of vehicle frame 1 in the direction of arrow 10 about transverse axis 5.

At the exterior of the rear container portion, centering projections 11 are provided in the bottom region to grip around the exterior of vehicle frame 1, when it is in its lowered position. Pocket or bar-like projections 12 are fastened to vehicle frame 1 so as to themselves grill around centering projections 11. Like centering projections 11, projections 12 are provided with transverse bores so that centering bolts 13 can be used to secure the rear container portion, when it is in its lowered state, to the vehicle frame and against tilting as well as lateral pivoting. Additionally, a safety catch 14 is provided at both side walls of rear container portion 4, in the region of upper edge 7, so as to project beyond dividing groove 6 and engage in a corresponding recess at the associated side wall of front container portion 3, when the latter is in the lowered state, so that, in this position, the side walls of both container portions are form-lockingly connected together in this region.

At front container portion 3, a ram plate 15 is disposed at front wall 17 so as to be displaceable in the longitudinal direction of container 2. The pushing drive is provided by a hydraulic piston-cylinder unit 16, whose one end is articulated to ram plate 15 while its other end is fastened to an articulation at front wall 17.

Due to the fact that the piston-cylinder unit is inclined with respect to the bottom 18 of the container, with the point 19 of articulation at ram plate 15 being in front, it is assured that the leading edge 20 of ram plate 15 is always guided close to the bottom. In its lower region, ram plate 15 is provided with skids 21 which extend parallel to bottom 18 at either side and are guided in corresponding guide rails 22 disposed on the interior container side walls. Guide rails 22 here extend into rear container portion 4 and are interrupted, in the same manner as the container side walls, by dividing groove 6.

Figure 3:
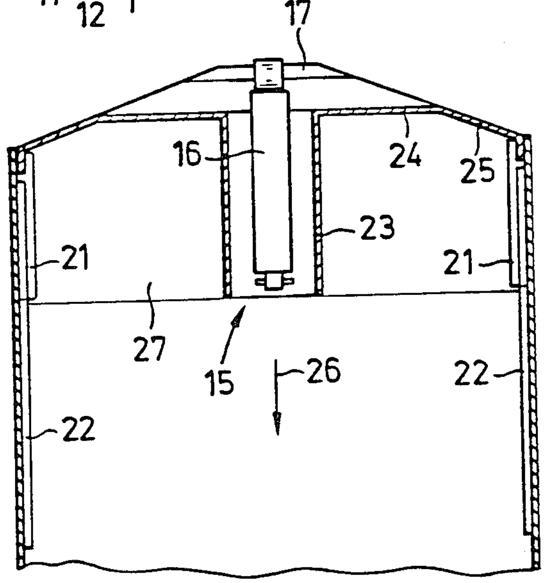
FIG. 3 is a horizontal sectional view of the ram plate along line III—III of FIG. 1.

As shown by the horizontal sectional view of ram plate 15 in FIG. 3, the ram plate is provided with a bulge 23 which extends into the container interior and accommodates part of the structural length of a piston-cylinder unit 16. In region 25 adjacent the side walls, the plate surface 24 of ram plate 15 is inclined forwardly in the pressing direction (arrow 26) so that, during discharging of the contents of the container, the pressure on the side walls is reduced in the immediate area of influence of the ram plate. On its underside, the ram plate is terminated on the underside by a bottom plate 27.

Figure 2:
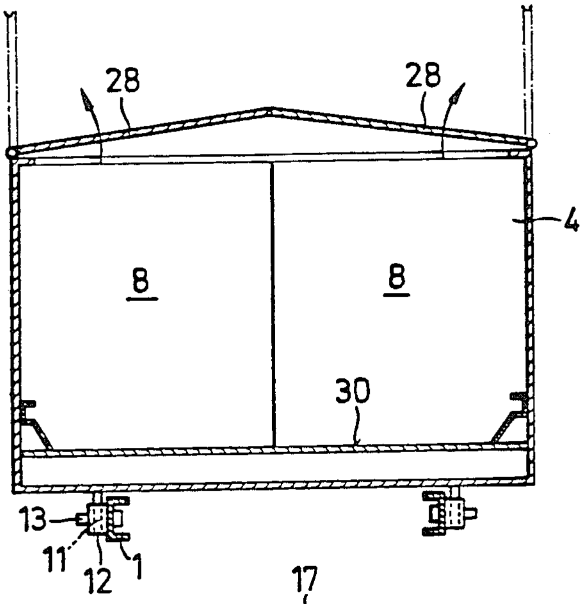
FIG. 2 is a cross-sectional view along line II—II of FIG. 1.

The upper continuous container opening is closable by covers 28 (FIG. 2) For filling and emptying, covers 28 are folded over so that they rest against the side walls. Covers 28 are divided in length corresponding to the path of the dividing groove between the front and rear container portion so that each container portion is provided with one pair of covers. The covers may here be closed either on their surfaces, for example by a sheet metal plate, or may each be composed of a retaining frame on which is tensioned a tight mesh screen. Covers 28 may here be connected with a releasable arresting means which makes it possible to detain the covers in an approximately perpendicular intermediate position, as shown by dot dash lines in FIG. 2, so that the lateral limitation of the upper container opening is higher during the filling as well as the emptying process, which will be described in greater detail below. To facilitate operation, the pivotal covers may each be in communication with appropriate setting drives, for example hydraulic drives 29, each disposed in the frontal region.

When the above-described container semitrailer, with its covers 28 open and standing below a dump ramp, has been completely filled with precompacted refuse, covers 28 are closed and the container semitrailer is hitched to the tractor and driven to the discharging location, for example a dump. After the vehicle has approached the dumping location in reverse gear, covers 28 and tailgate covers 8 are opened first. Then, with the aid of hydraulic cylinder unit 16, ram plate 15 is advanced so that, corresponding to the advance of the ram plate from rear container portion 4 a corresponding quantity of refuse is discharged. Ram plate 15 is here displaced in the longitudinal direction through the front, stationary container portion 3 until it reaches the transition region to the rear container portion which is still locked tight to vehicle frame 1. Ram 15 is thus pushed by guide rails 22 which extend into rear container portion 4. The end position of the ram is shown by dot-dash lines in FIG. 1. In the illustrated and described embodiment, ram plate 15 is now retracted again into front container portion 3 so that after releasing of locking bolt 13 with the aid of dump press 9, rear container portion 4 can be tilted up so that the remaining contents of this portion are able to slide out under the influence of gravity. To facilitate displacement and dumping of the container contents in the region of rear container portion 4, the free container cross section here becomes increasingly larger, at least in its end region, which is effected in the illustrated embodiment in that bottom 30 of rear container portion 4 is sloped downwardly toward the rear edge. When emptying is completed, rear container portion 4 is pivoted back to its starting position so that the two side wall portions again lie tightly on top of one another in the region of dividing groove 6, centering projections 11 engage in their guides 12 at vehicle frame 1 and centering catches 14 engage in corresponding recesses at the upper edge of the side walls, so that, after all parts are locked and covers 28 as well as tailgate covers 8 are closed, the vehicle can be returned to the refuse reloading location to there be loaded again.

Since during the emptying process, ram plate 15, in its end-of-pushing position shown in dot-dash lines in FIG. 1, is held in rear container portion 4 by guide rails 22, it is also possible, in deviation from the above-described embodiment, to make the connection between pushing drive 16 and ram plate 15 releasable in such a manner that, once the illustrated end position is reached, the tilting process causes ram plate 15 to be released from pushing drive 16. This can be effected, for example, by means of a clawlike coupling 31 between a portion 32 of the ram plate 15 and pushing drive 16 and a corresponding guide 33 connected with the free end of pushing drive 16 in front container portion 3 as shown in FIG. 4. During the dumping process, ram plate 15 then forms a "front wall" with respect to rear container portion 4, which is likewise tilted up and is coupled with pushing drive 16 for retraction only when lowered into the travelling position. This prevents fill material from falling back, as is possible in the embodiment described with reference to FIG. 1 which has a ram plate that is fixed to pushing drive 16 and happens whenever the ram plate must be pulled back before the rear container portion is tilted up to leave the tilting region. Since, however, the refuse filled into the container from the refuse collection vehicles is precompacted to a certain degree and is compacted more by the pushing action during emptying, particularly in the region where the ram plate acts on refuse fill, a relatively short penetration of the ram plate 15 into the front region of the rear container portion 4 is sufficient to prevent the refuse from falling back into the front container portion after retraction [of the ram plate], as the usual household refuse has a very high fill angle and is able, even with a slight degree of compacting, as it occurs here when the refuse is being pushed out of the container to form an almost vertical interface with the additional support of the side walls.

The advantage of the vehicle according to the invention comes to bear not only during the unloading process at a refuse dump but in the same manner also at other discharging locations, for example also at the discharging points of refuse incinerators since the free space that must be maintained above the fill funnel can be kept at the height customary for trucks or dumpable refuse collection vehicles, while the dumping of a continuous container of the length of a semitrailer requires a free space of at least 20 m. By subdividing the container so that it has a shortened tailgate portion, the length and thus the costs for dump press 9 are likewise reduced.

We claim:

1. Vehicle for transporting refuse or the like, said vehicle having a longitudinal axis and front and rear ends and comprising: a vehicle frame; a container supported by said frame and having two side walls and an openable rear wall, located at said rear end of said vehicle, said container being divided at a dividing boundary transverse to the longitudinal axis of said vehicle into a front container portion and a rear container portion, said portions being dimensioned such that in the region of the bottom of said container the dividing boundary is located approximately at the midpoint of the length of said container, said front container portion being fixed to said vehicle frame and said rear container portion being mounted on said vehicle frame for pivoting movement about an axis extending transversely to the longitudinal axis of said vehicle and located in the region of said rear end of said vehicle, and said rear container portion carrying said openable rear wall and having an interior cross section which increases toward said opneable rear wall; a tilting drive connected to said rear container portion for pivoting said rear container portion about the axis of pivoting movement; a ram plate normally disposed in said front container portion and extending across the interior cross secton of said front container portion; and a pushing drive coupled to said ram plate for displacing said ram plate in the direction of the longitudinal axis of said vehicle between the end of said container which is directed toward said front end of said vehicle and at least the location of the dividing boundary in the region of the bottom of said container, and wherein both portions of said container extend to the same height and are both constituted to be filled from the top.

2. Vehicle according to claim 1, characterized in that, in order to increase its cross sectional area, the container bottom (30) is designed to be downwardly inclined, at least in its end region.

3. Vehicle according to claim 1, characterized in that, in the two side walls, the dividing boundary (6) is sloped rearwardly toward the container bottom, starting at the upper edge (7) of the side walls.

4. Vehicle according to claim 1, characterized in that, for longitudinal guidance of the ram plate (15), at least one guide rail (22) is provided at each container side wall.

5. Vehicle according to claims 1, characterized in that at least one centering projection (11) which cooperates with the vehicle frame (1) is provided at the rear container portion, on the exterior of the container bottom.

6. Vehicle according to claim 5, characterized in that there are at least two said centering projections (11) are provided at the rear container portion (4) and said centering projections project laterally beyond the vehicle frame (1) so as to be locked to the vehicle frame (1).

7. Vehicle according to claim 1, characterized in that the ram plate (15) is releasably connected with the pushing drive (16) and is held in its end-of-pushing position by the rear container portion (4) and can be tilted tcgether with said rear container portion.

8. Vehicle according to claim 1, characterized in that the ram plate (15) is provided with side edges (25) which are inclined in the pressing direction with respect to the side walls.

9. Vehicle according to claim 8 characterized in that, said pushing drive comprises, a hydraulic piston-cylinder unit the center region of the ram plate (15) is provided with a bulge (23) which projects into the interior of the container and with a bottom plate (27) which starts at the forwardly inclined side edges (25) and extends over the entire width of the container immediately above the container bottom.

10. Vehicle according to claim 1, characterized in that the two side walls of the container (2), in the region of the dividing boundary (6), are each provided with a centering system (14) which produces a form-locking connection between the two adjacent side walls of both container portions when the rear container portion (4) rests on the vehicle frame (1).

11. Vehicle according to claim 1, characterized in that the top of the container (2) is open, at least over part of its length, and can be closed by means of covers (28) which are mounted at its side wall so as to be pivoted upwardly.

12. Vehicle according to claim 11, characterized in that the upper container opening extends practically over the entire length of the container and the covers (28) are each subdivided in the region of the dividing boundary (6).

13. Vehicle according to claim 11, characterized in that the covers (28) are connected with at least one pivoting drive (29).

14. Vehicle according to claim 1, characterized in that the vehicle is designed as a semitrailer for a tractor trailer vehicle.

15. Vehicle according to claim 4 wherein said guide rails are located in the lower region of each side wall.

16. Vehicle according to claim 5 wherein said centering projection is located in the region of the dividing boundary.

17. Vehicle according to claim 10 wherein said centering system is located in the upper region of said side walls.

* * * * *